US 6,627,027 B2

(12) United States Patent
Huang

(10) Patent No.: US 6,627,027 B2
(45) Date of Patent: Sep. 30, 2003

(54) METHOD OF MAKING A SHOCK ABSORBING GRIP FOR GOLF CLUBS AND THE LIKE

(76) Inventor: Ben Huang, 19742 Woodlands La., Huntington Beach, CA (US) 92648

( * ) Notice: Subject to any disclaimer, the term of this patent is extended or adjusted under 35 U.S.C. 154(b) by 0 days.

(21) Appl. No.: 09/929,414

(22) Filed: Aug. 13, 2001

(65) Prior Publication Data

US 2003/0032495 A1 Feb. 13, 2003

(51) Int. Cl.[7] .................... B32B 33/00; B32B 27/04; B32B 27/12; B32B 27/40; B32B 3/26
(52) U.S. Cl. .................. 156/209; 156/219; 156/246; 156/247; 156/249; 156/269; 156/270
(58) Field of Search ........................ 156/182, 249, 156/247, 184, 187, 209, 219, 246, 269, 270; 428/304.4, 319.9; 473/300

(56) References Cited

U.S. PATENT DOCUMENTS

| 4,137,360 A | * | 1/1979 | Reischl | 264/41 |
| 4,347,280 A | | 8/1982 | Lau et al. | |
| 4,358,499 A | * | 11/1982 | Hill | 428/220 |
| 4,448,922 A | * | 5/1984 | McCartney | 427/246 |
| 5,611,153 A | * | 3/1997 | Fisher et al. | 36/173 |
| 5,695,418 A | | 12/1997 | Huang | |
| 5,797,813 A | | 8/1998 | Huang | |
| 5,813,921 A | | 9/1998 | Huang | |

* cited by examiner

Primary Examiner—Richard Crispino
Assistant Examiner—Sing P. Chan
(74) Attorney, Agent, or Firm—Fulwider Patton Lee & Utecht, LLP

(57) ABSTRACT

A method for manufacturing a grip material consisting of a layer of polyurethane and a layer of EVA. A nylon cloth material is used as a temporary support for coagulating the polyurethane by a wet coagulation process. The coagulated polyurethane is then separated from the nylon cloth material and subsequently joined with a strip of EVA material to yield a grip material with the tackiness and superior shock cushioning characteristics of a polyurethane/felt grip combined with the water resistant and lightness characteristics of a polyurethane/EVA grip.

6 Claims, 8 Drawing Sheets

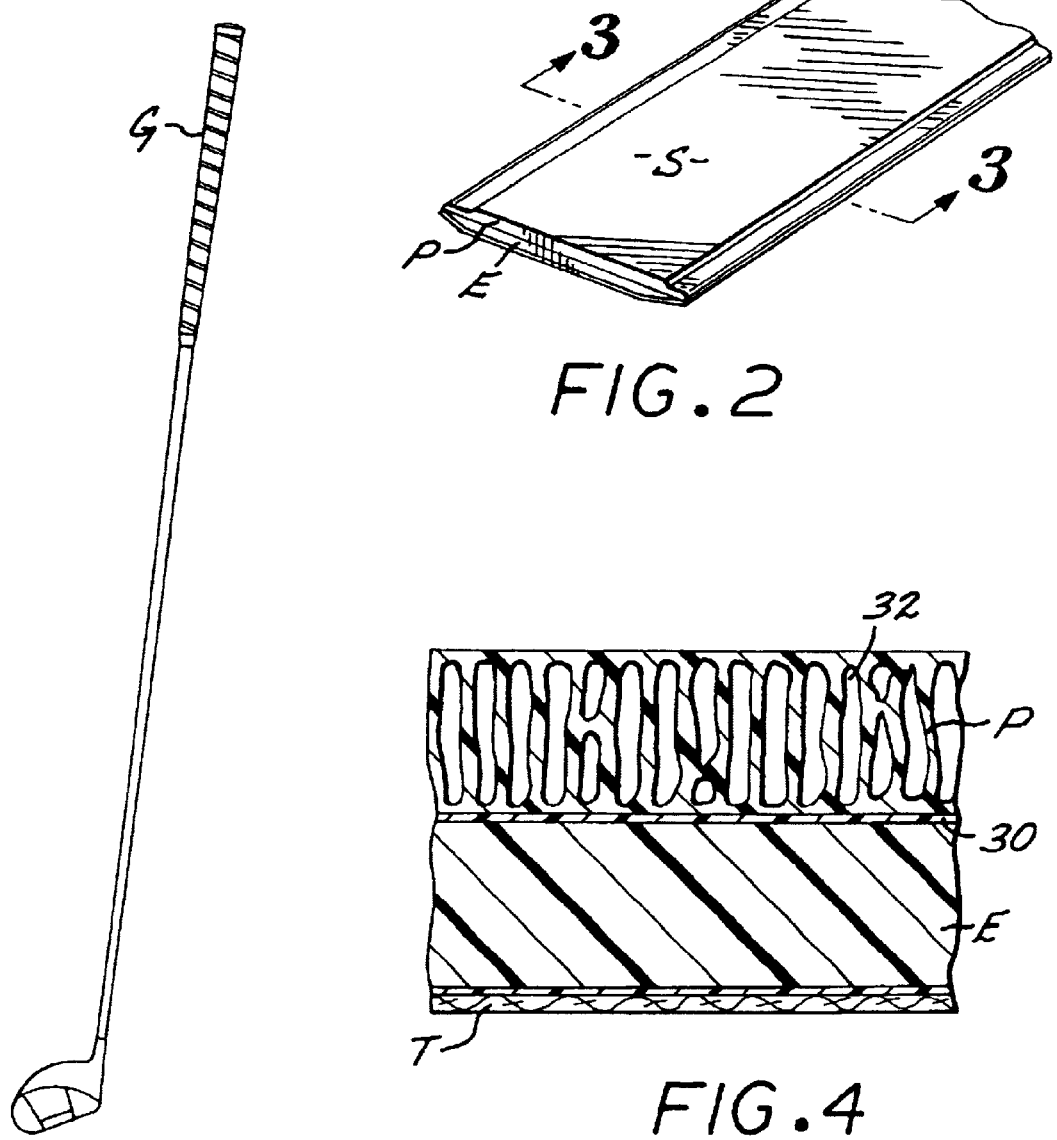
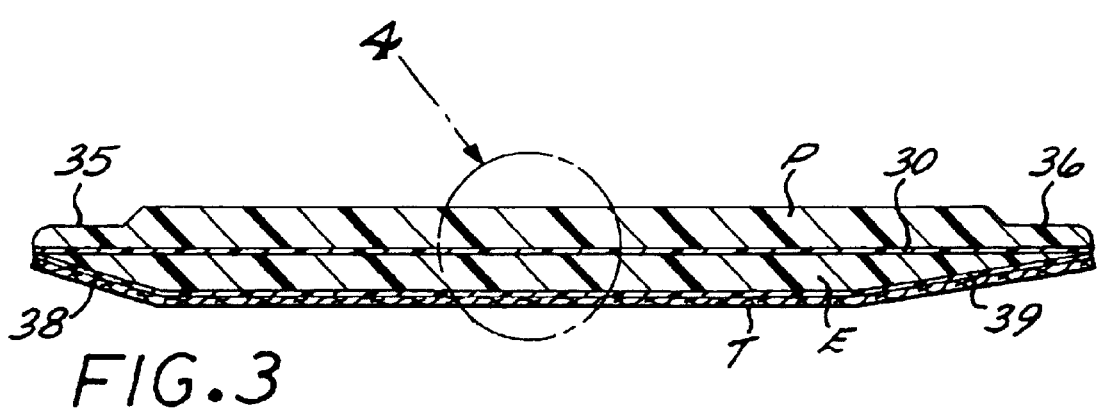

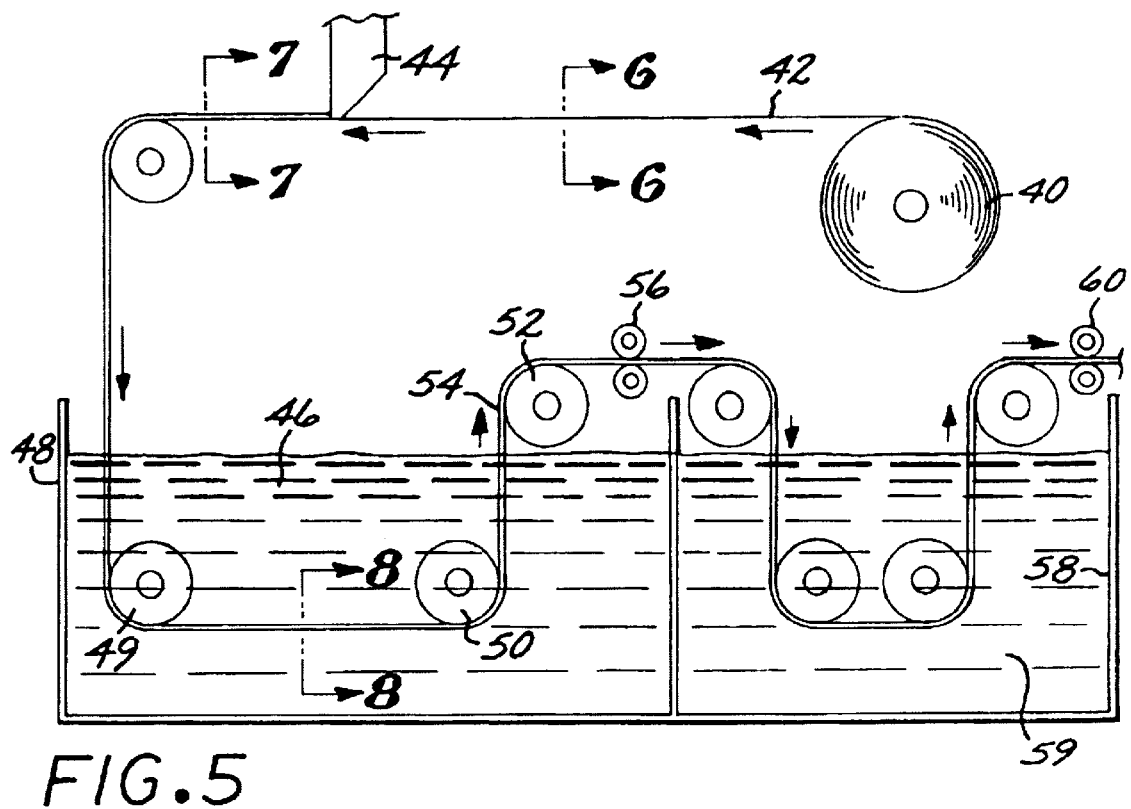
FIG.5
FIG.6
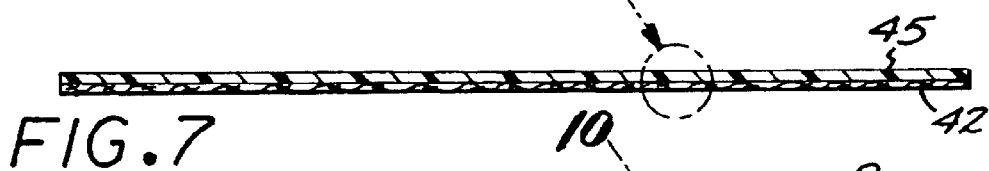
FIG.7
FIG.8
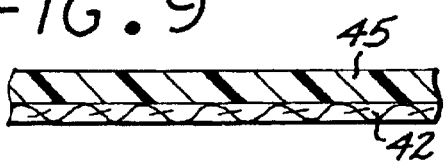
FIG.9
FIG.10

FIG. 25
FIG. 26
FIG. 27
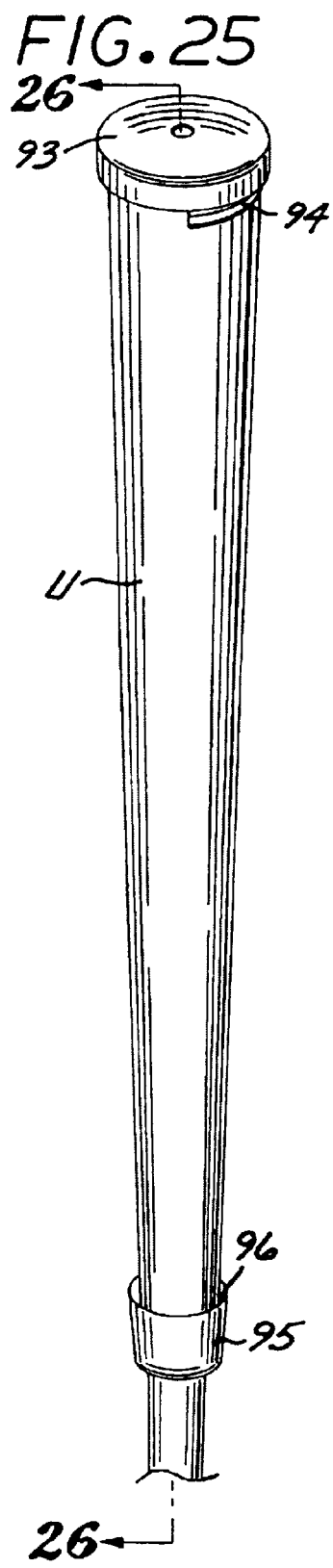
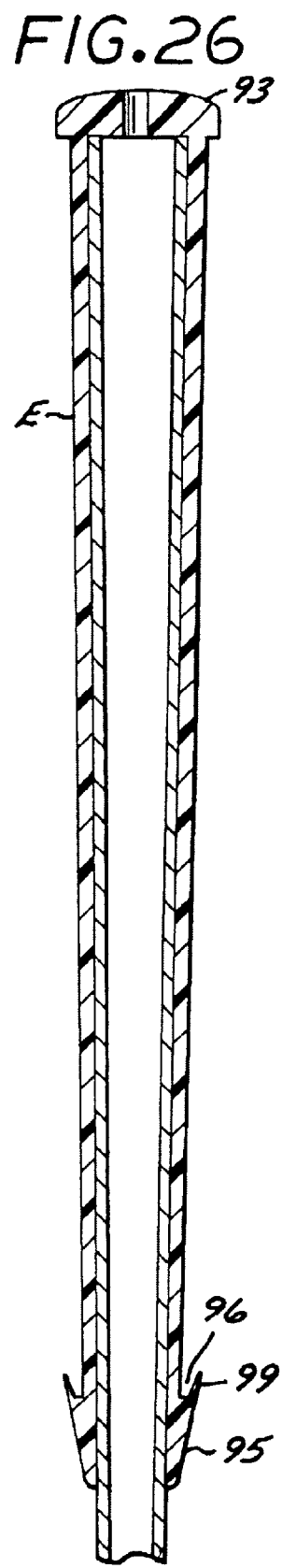
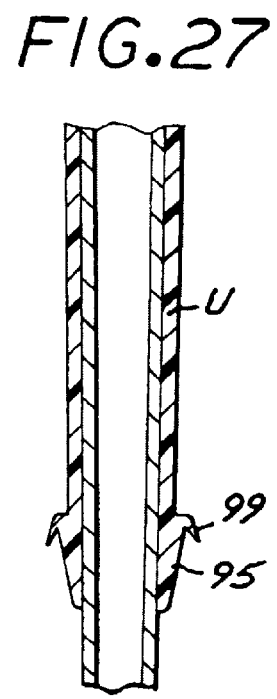

METHOD OF MAKING A SHOCK ABSORBING GRIP FOR GOLF CLUBS AND THE LIKE

BACKGROUND OF THE INVENTION

The present invention relates to a method of making an improved grip for golf clubs and other devices employing handles that are subject to shock when such devices are impacted, as for example, golf clubs, tennis ball racquets, racquetball racquets, baseball bats, and hammers.

There have previously been developed resilient grips which successfully reduce shock to the muscle and arm joints of the users of golf clubs, tennis racquets, racquet ball racquets, baseball bats and other impact imparting devices. See, for example, U.S. Pat. No. 5,797,813 granted to applicant Aug. 25, 1998. Such earlier grips utilize a polyurethane layer bonded to a felt layer to define a strip which is spirally wrapped around the handle of a golf club, racquet or the like to conform to the external configuration of such handle, or in the case of a golf club, a resilient underlisting sleeve which is slipped onto the handle of a golf club.

In such grips the polyurethane material provides tackiness to resist slippage by a wet or sweaty hand, while both the polyurethane as well as the felt contribute to the overall cushioning effect of the grip. The felt material additionally serves as a substrate for the manufacture of the polyurethane layer when a 'wet coagulation' method is employed, wherein the polyurethane is applied directly to the felt as the felt is drawn through the various manufacturing stages in a continuous process. Coagulation of the polyurethane takes place after its deposition on the felt which causes it to become intimately joined with the felt fibers. Such coagulation also forms closed pores in the polyurethane layer which assists in providing a cushioning effect of the grip.

While prior art polyurethane/felt grips have been developed that provide the desired shock absorption properties, the felt material is prone to absorbing water. Accordingly, the grip will tend to absorb the perspiration from the user's hand and may become saturated during play thereby causing slippage of the golf club or tennis racquet in the user's hands. The same problem occurs under wet conditions such as when playing golf in the rain. In an effort to address this problem, the present invention proposes the use of EVA (ethylene-vinyl acetate copolymer) as a substitute for the felt substrate. The use of EVA as a substitute for felt can also reduce the weight of a grip up to one-half the weight of a conventional polyurethane/felt grip. Such reduction of grip weight will reduce the total weight of a golf club, as well as provide an increase in the swing weight of the club. With previously used polyurethane/EVA grips the polyurethane layer of such grip is made by a 'dry coagulation' method wherein the thickness of the polyurethane layer that can be produced is severely limited. The conventional dry coagulation method requires the polyurethane to first be applied to a paper strip on which it is allowed to air dry to become coagulated, Upon coagulation, the paper is stripped from the polyurethane and a layer of EVA material and an adhesive is applied directly to the coagulated polyurethane. Such method limits the thickness of the polyurethane to a thickness of about 0.10 mm and therefore limits the size of any pores which may be formed in the coagulated polyurethane and hence the amount of shock absorption provided by a grip made by such method. By contrast, a polyurethane/felt grip utilizing a "wet coagulation method," such as described in my aforementioned U.S. Pat. No. 5,797,813, can provide a polyurethane layer having a thickness of up to 1.5 mm, and with such polyurethane layer being formed with closed pores that extend through a substantial portion of the polyurethane layer. These pores make it possible for the grip to readily absorb the shock created when a golf ball is struck by a golf club.

A method of making a polyurethane/EVA grip is therefore needed that is capable of producing a tacky grip having a greater degree of cushioning or shock absorption than is available from currently available polyurethane/EVA grips made by dry coagulation methods, and with such grip having the light-weight and water excluding characteristics of a grip utilizing EVA. Additionally, a method of manufacture is needed for economically making such improved grip.

SUMMARY OF THE INVENTION

The present invention is directed to a method for making polyurethane/EVA grips wherein the polyurethane layer of such grip can have a thickness of up to 1.5 mm, whereby pores can be formed in the polyurethane layer when such layer is coagulated so as to provide a polyurethane/EVA grip having the shock absorbing characteristics of a polyurethane/felt grip. Additionally, such method permits the precise ratio of the thicknesses of the polyurethane and EVA layers to be determined for a particular grip application in terms of the tackiness and shock cushioning characteristics of the grip material.

More particularly, a preferred method of the present invention provides for the use of a nylon cloth for the temporary support of polyurethane during a wet coagulation of the polyurethane, the raw polyurethane material being applied to the nylon cloth in a continuous fashion through the various steps of such method. After coagulation of the polyurethane is complete, the coagulated polyurethane is separated from the nylon cloth and joined with an EVA substrate by an adhesive layer, again in a continuous manner. It has been found that the use of a nylon cloth and the wet coagulation of the polyurethane allows a significantly thicker layer of polyurethane to be formed than is possible with dry coagulation of the polyurethane. The polyurethane layer can be made as tacky and supple as desired to provide an appropriate amount of tackiness for the grip, while the polyurethane and EVA combination can provide the desired amount of shock cushioning. Moreover, the use of an EVA substrate provides a grip which will not absorb water.

The features and advantages of the present invention will become apparent from the following detailed description of a preferred embodiment which, taken in conjunction with the accompanying drawings, which illustrate by way of example the principles of the invention.

BRIEF DESCRIPTION OF THE DRAWINGS

FIG. 1 is perspective view of a golf club provided with a polyurethane/EVA grip made in accordance with the method of the present invention;

FIG. 2 is a broken perspective view in enlarged scale of a polyurethane/EVA strip utilized in forming the grip shown in FIG. 1;

FIG. 3 is a vertical sectional view taken along line 3—3 of FIG. 2;

FIG. 4 is an enlarged view of the encircled area designated 4 in FIG. 3;

FIG. 5 is a schematic view showing a first step in the preferred method of the present invention;

FIG. 6 is a vertical sectional view taken in enlarged scale along lines 6—6 of FIG. 5, of a web of nylon cloth utilized in the step of FIG. 5;

FIG. 7 is a vertical sectional view taken in enlarged scale along line 7—7 of FIG. 5, showing a layer of uncoagulated polyurethane deposited on the nylon cloth of FIG. 6;

FIG. 8 is a vertical sectional view taken in enlarged scale along line 8—8 of FIG. 5 showing the polyurethane layer after it has been coagulated;

FIG. 9 is an enlarged view of the encircled area designated 9 in FIG. 6;

FIG. 10 is an enlarged view of the encircled area designated 10 in FIG. 8;

FIG. 25 is a perspective view showing an underlisting sleeve which receives the strip of FIG. 24 to define a polyurethane/EVA grip in accordance with the present invention;

FIG. 26 is a vertical sectional view taken along lines 26—26 of FIG. 25;

FIG. 27 is a broken side elevational view of the lower portion of the underlisting sleeve of FIGS. 25 and 26;

Referring to FIGS. 1–4 of the drawings, a grip G formed in accordance with a preferred method embodying the present invention utilizes an elongated resilient strip S which is spirally wrapped around a resilient underlisting sleeve (FIGS. 25–30) which is slipped onto the handle of a golf club (FIG. 1), or directly onto the handle of a golf club. Such strip may also be applied to the handle of other impact imparting devices (not shown). As shown in FIGS. 3 and 4, strip S includes a polyurethane layer P and an EVA layer E, the latter having its upper surface secured to the lower surface of the polyurethane layer by an adhesive 30. The underside of the EVA layer is originally covered with a conventional double adhesive-sided peel-off tape T. As shown in FIG. 4, the polyurethane layer P is formed with generally vertically extending pores 32 when the polyurethane layer is coagulated in accordance with the method of the present invention. Referring again to FIG. 3, the upper sides of the polyurethane layer P are formed with recessed reinforcement edges 35 and 36. The underside of the EVA layer is formed with slanted side edges 38, 39. Pores 32 are elongated to extend through a substantial portion of the polyurethane layer and are oriented so as to extend generally normal to the plane defined by the longitudinal axis of the polyurethane layer. Such orientation greatly enhances the shock absorbing capability of the polyurethane layer. The thickness of the wet coagulated polyurethane should be greater than about 0.1 mm to 1.5 mm. The EVA layer can range between about 0.3 mm to 2.20 mm.

Referring now to FIGS. 5–10, there is shown a method of forming a web of polyurethane/nylon cloth as a first step employed in a preferred embodiment of the method of the present invention. Referring to the upper right-hand portion of FIG. 5, there is shown a supply roll 40 of smooth, flexible nylon cloth web 42. From the supply roll 40, the nylon cloth is moved horizontally to the left below a polyurethane dispensing nozzle 44. Such nozzle continually deposits a layer of liquid polyurethane 45, e.g., polyester or polyether dissolved in dimethyl formahide (DMF), onto the upper surface of the nylon cloth 42. The web of polyurethane-coated nylon cloth is then moved into a water bath 46 contained in a first tank 48. As the polyurethane-coated nylon cloth web is immersed in the water bath 46, the urethanes will coagulate so as to form the plurality of generally vertically extending closed pores 32 shown in FIG. 4 and in FIG. 10. The coagulation time of the polyurethane will be determined by the desired thickness of the polyurethane layer P, with a thin layer requiring less time to coagulate than a thick layer. A pair of rollers 49 and 50 are positioned within the tank 48 to carry the polyurethane/nylon cloth web horizontally and then upwardly out of the water bath 46 over roller 52. The coagulated polyurethane/nylon web cloth 54 is then moved horizontally to the right between a pair of squeezing rollers 56. These squeezing rollers compress the coagulated polyurethane/nylon cloth web 54 so as to force a major portion of the DMF disposed within the pores 32 downwardly through the weave of the nylon cloth 42 of the web 54. It should be understood that the lower end of a sufficient member of the pores 32 are in contact with the upper portion of the nylon web 42 to permit fluid flow from the pores through the nylon material. The coagulated polyurethane/nylon cloth web is then moved downwardly through one or more cleaning water bath tanks 58 (only one of which is shown), wherein the temperature of the water is sufficiently high to displace more DMF from the pores 32 with such DMF being replaced by water 59 contained in tank 58. From tank 58, the coagulated polyurethane/nylon cloth passes through another pair of squeezing rollers 60 to squeeze more of the DMF out of the pores 32 to be replaced with water 59. In practice, it may be necessary to utilize four or five cleaning baths to remove a desired amount of DMF from the pores. From the last water bath, the coagulated polyurethane/nylon cloth web 54 is passed through a heating chamber (not shown) which drives out any water remaining within the pores 32 so that such water is replaced by air. It should be understood that the aforedescribed method of forming a coagulated polyurethane layer is known to those skilled in the art. A suitable nylon cloth is available from the Ho Ya Electric Bond Factory, Xin Xing Ind. Area. Xin Feng W. Rd., Shi Jie Town Dong Guan City, Guan Dong, Province, China.

Referring now to FIGS. 11–17, there is shown a preferred embodiment of the method of the present invention which utilizes the coagulated polyurethane/nylon cloth 54 produced in accordance with the description of FIGS. 5–10. At the lower left-hand portion of FIG. 11, there is shown a supply roll 64 for a web of coagulated polyurethane/nylon cloth 54. The web 54 is moved upwardly over guide roller 66 and then horizontally in a right-hand direction over a nylon cloth strip-off roller 67. The strip-off roller 67 carries the nylon cloth 42 downwardly over a receiving spool 68 as the nylon cloth 42 is removed from the coagulated polyurethane/nylon cloth web 54. The upper surface of the nylon cloth should be sufficiently smooth to permit easy removal of the coagulated polyurethane P from the nylon cloth. The coagulated polyurethane component of the coagulated polyurethane/nylon cloth web continues to be moved horizontally to the right over a right-hand guide roller 72. Downstream of the strip-off roller 67 the coagulated polyurethane web moves between a compressing roller 74 and a guide roller 75 disposed below roller 74. Guide roller 75 receives a web of EVA material E coated with adhesive 30 from a supply reel 76 provided with the adhesive 30 shown in FIGS. 3, 4, and 17. The web of coagulated polyurethane P and the web of EVA/adhesive material E are compressed between compressing roller 74 and guide roller 75 causing the two webs to be bonded together as indicated in FIGS. 16 and 17 by adhesive 30. Adhesive 30 is initially covered by a paper backing 80 which is peeled from the EVA layer by a peeling roller 82 below guide roller 75 from which the paper is wrapped around a paper-receiving spool 84. EVA having an adhesive coating covered by a protective paper is sold by the aforementioned Ho Ya Electric Bond Factory. The web of coagulated polyurethane and EVA material 54 is then moved horizontally over guide roller 75 and then downwardly onto a receiver roll spool 87.

It should be noted that, materials other than nylon cloth may provide a satisfactory flexible temporary support for the polyurethane during wet coagulation thereof. Such materials must have the fluid-passing characteristics and smooth upper surface of nylon cloth in order that the DMF and water can be squeezed out of the polyurethane pores, and that the coagulated polyurethane can be readily stripped off such temporary support. Other materials which may prove satisfactory as a temporary support include fluid-permeable textiles such as cotton or a synthetic cloth such as polyester.

Figure 11:
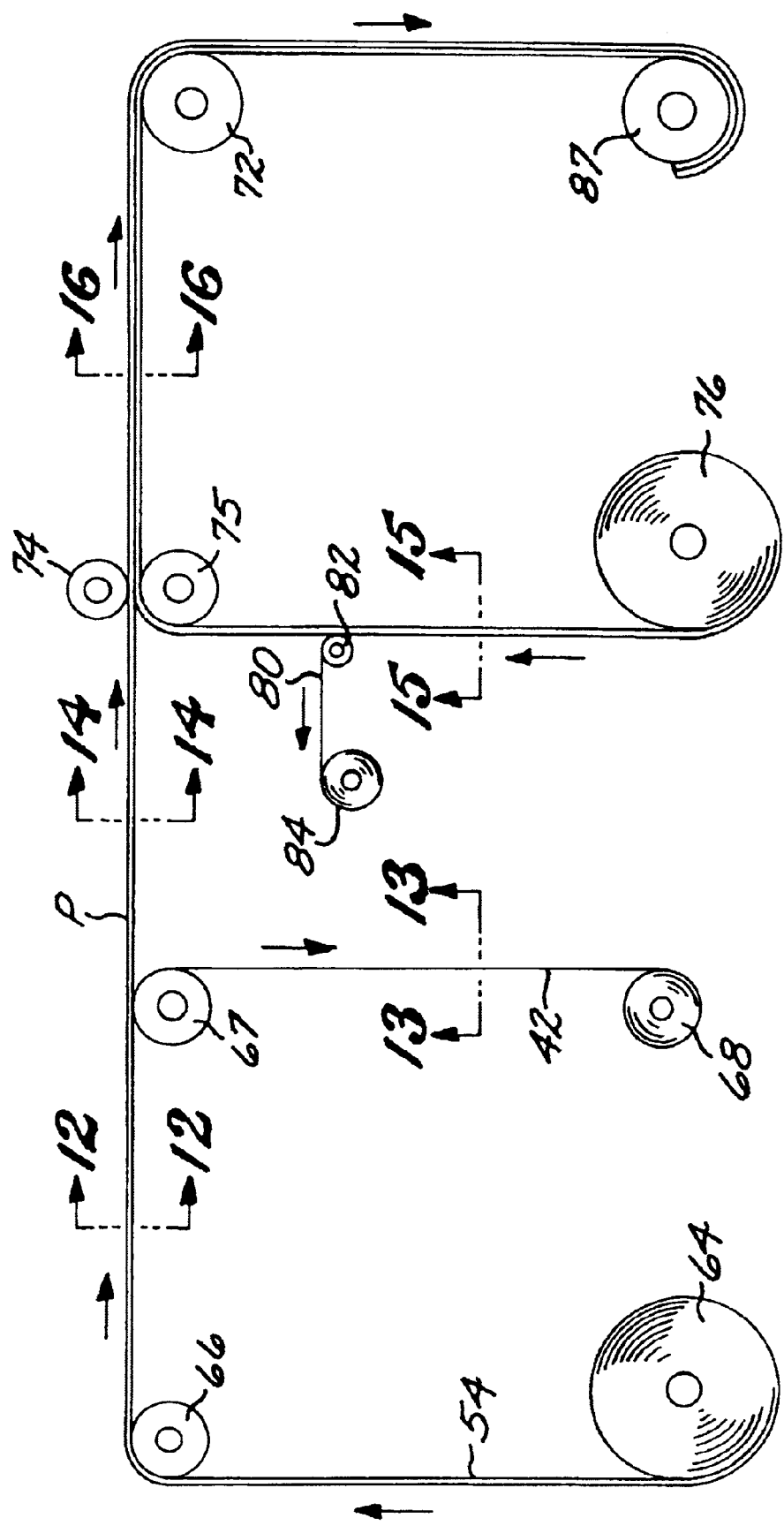
FIG. 11 is a schematic view showing a second step employed in a preferred method embodying the present invention.
Figure 12:
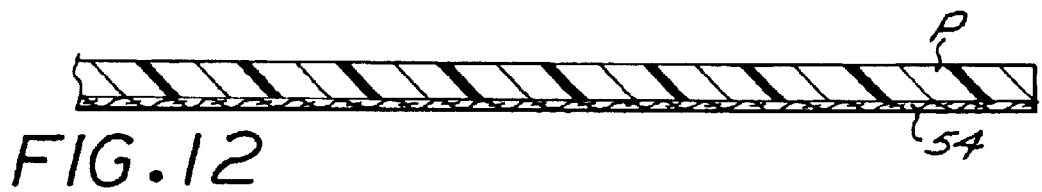
FIG. 12 is a vertical sectional view taken in enlarged scale along line 12—12 of FIG. 11 showing a web of polyurethane and nylon cloth formed by the step of FIG. 5.
Figure 13:
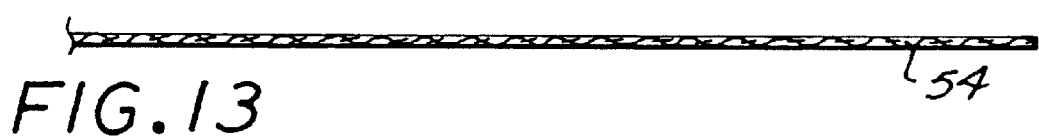
FIG. 13 is a horizontal sectional view taken in enlarged scale along line 13—13 of FIG. 11.
Figure 14:
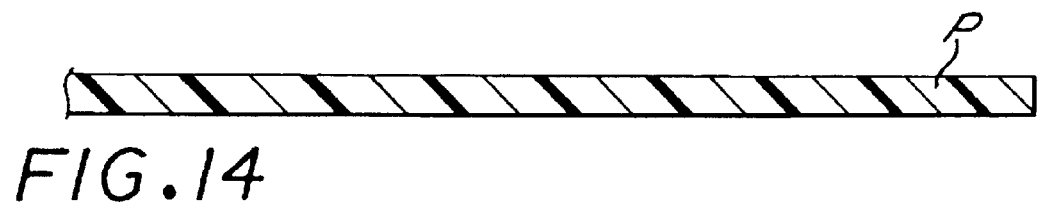
FIG. 14 is a vertical sectional view taken in enlarged scale along line 14—14 of FIG. 11.
Figure 15:
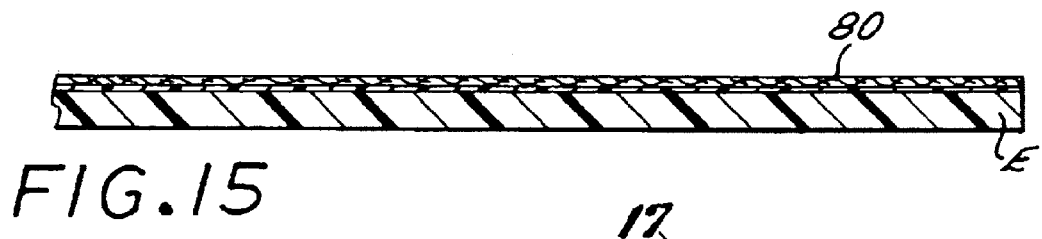
FIG. 15 is a horizontal sectional view taken in enlarged scale along line 15—15 of FIG. 11.
Figure 16:
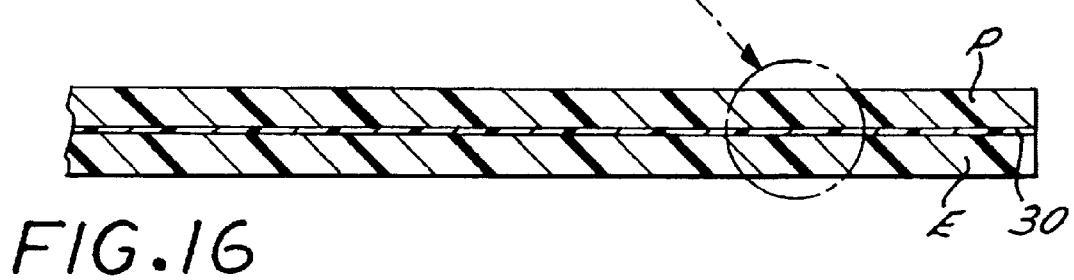
FIG. 16 is a vertical sectional view taken in enlarged scale along line 16—16 of FIG. 11.
Figure 17:
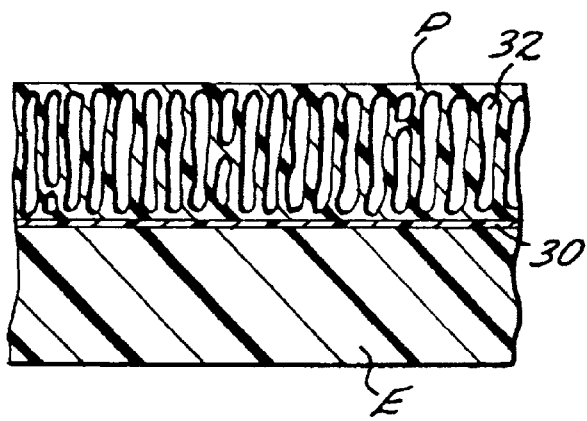
FIG. 17 is an enlarged view of the encircled area designated 17 in FIG. 16.

With continued reference to FIG. 11, it should be understood that in forming a completed spool of coagulated polyurethane/EVA material, the leading edge of web 54 of coagulated polyurethane/nylon cloth may be manually separated from the nylon cloth adjacent the nylon cloth strip-off roller 67 and the nylon cloth 42 fed manually downwardly onto receiving spool 68 for reuse in the formation of succeeding webs of finished coagulated polyurethane/EVA material. This arrangement reduces the cost of the present method. At the time the nylon cloth is separated from the coagulated polyurethane layer, the latter may be manually spooled through compressing roller 74 and guide roller 75, around right-hand guide roller 72 and then onto receiving spool 87. It should be understood that synchronized power-operated drive motors are provided for the various rollers, spools, and reels.

Figure 18:
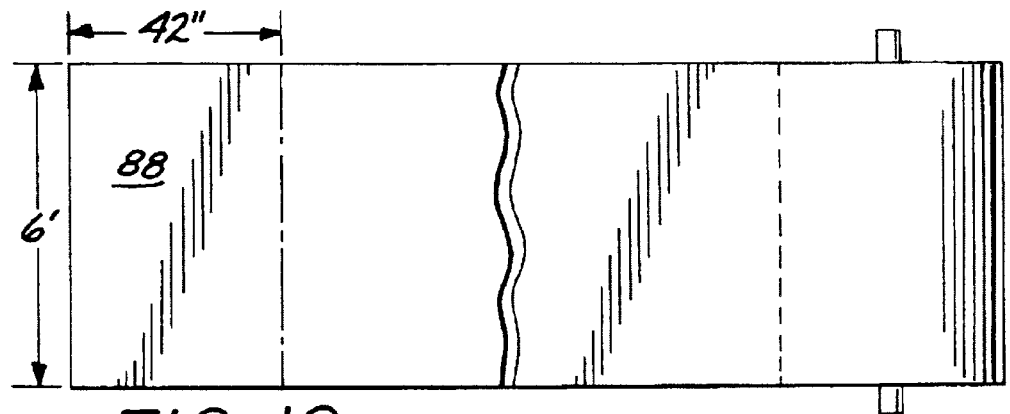
FIG. 18 is a broken top plan view showing a web of polyurethane/Eva substrate formed by the steps illustrated in FIGS. 5–17.
Figure 19:
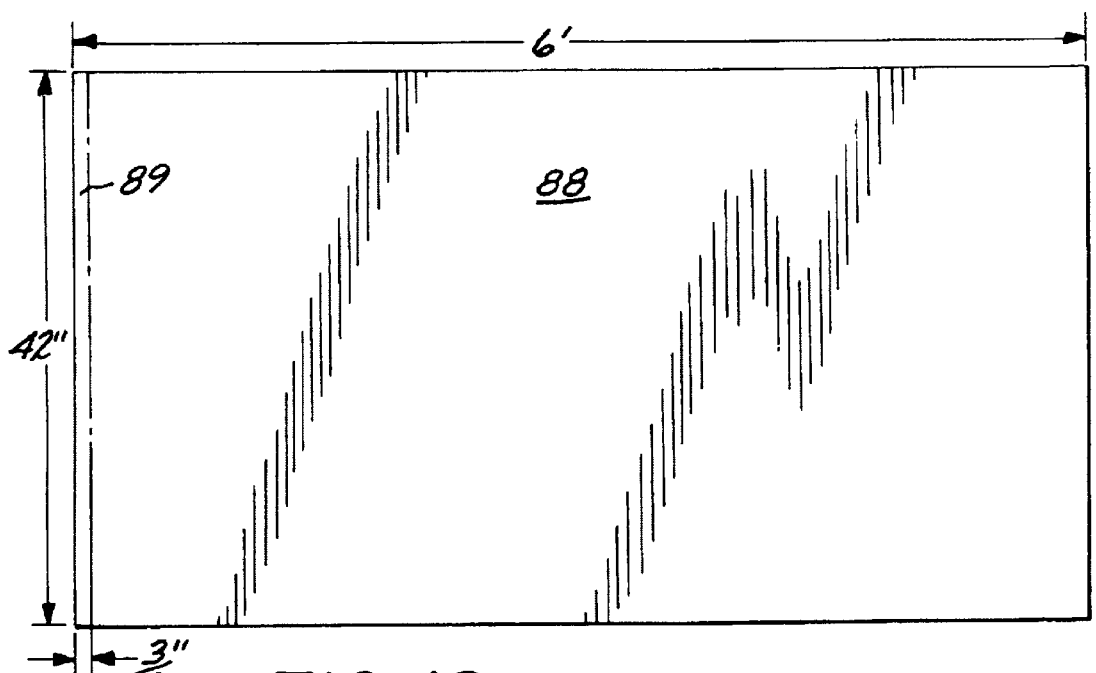
FIG. 19 is a top plan view showing a portion of the web of FIG. 18 dimensioned for cutting therefrom a plurality of polyurethane/EVA strip blanks made in accordance with the present invention.
Figure 20:
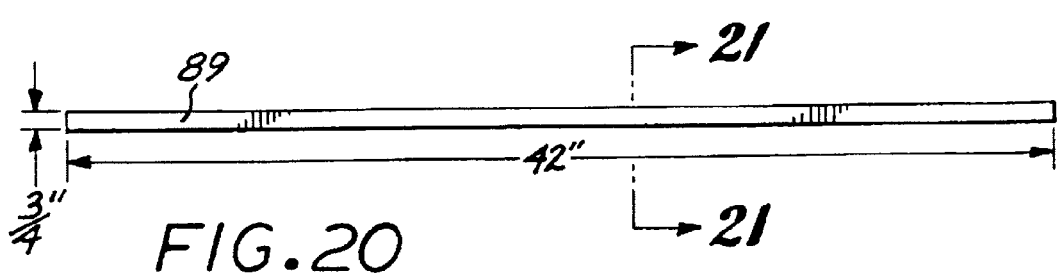
FIG. 20 is a top plan view of a strip blank cut from the web portion of FIG. 19.
Figure 21:
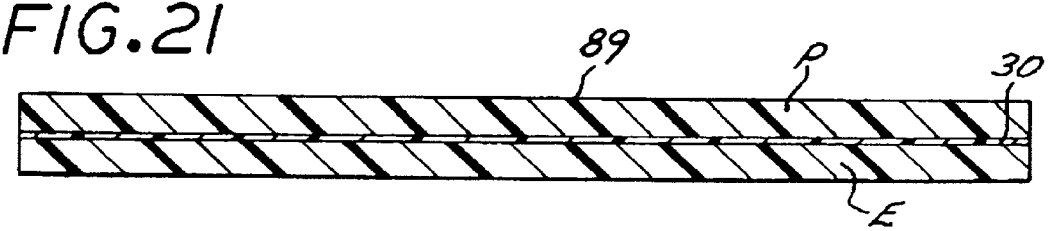
FIG. 21 is a vertical sectional view taken in enlarged scale along lines 21—21 of FIG. 20.
Figure 22:
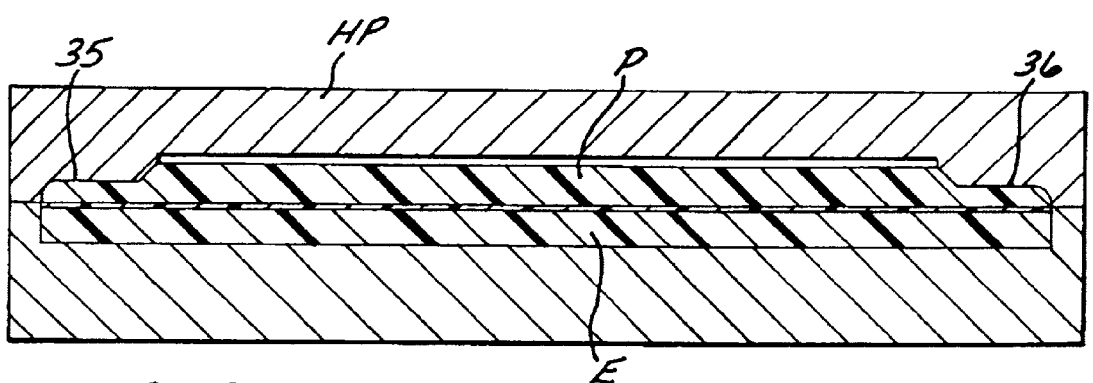
FIG. 22 is a vertical sectional view showing recessed reinforcement side edges being formed in the polyurethane layer of the strip blank FIG. 21.
Figure 23:
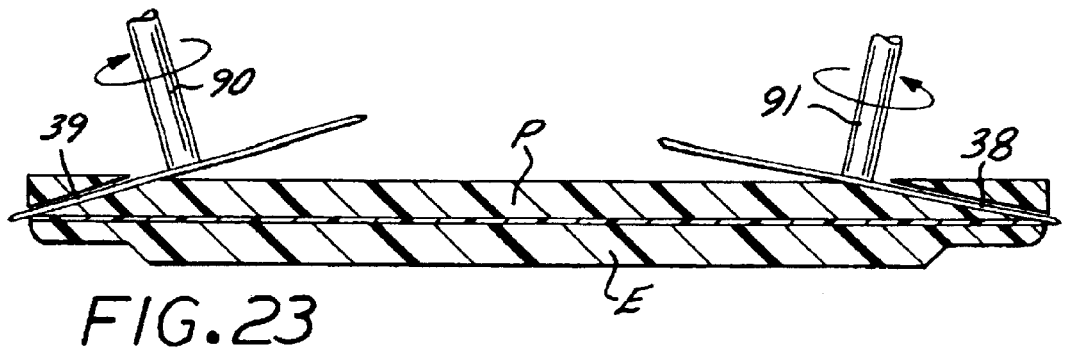
FIG. 23 is a vertical sectional view showing the side edges of the EVA layer of the strip blank of FIG. 21 being skived to define slanted side edges in such EVA layer.
Figure 24:
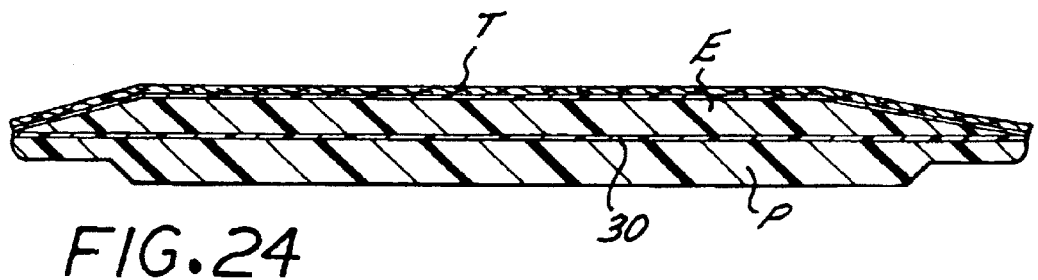
FIG. 24 is a vertical sectional view showing a peel-off adhesive tape applied over the EVA layer of the strip blank of FIGS. 21, 22, and 23.

Referring now to FIGS. 18–24, there is shown an arrangement for forming a strip S from the web of coagulated polyurethane/EVA material. In FIG. 18, a panel 88 of the coagulated polyurethane/EVA material is cut from a web of such material. By way of example the width of such panel can be 42 inches, and the length 72 inches. A plurality of strip blanks 89 are cut from the panel 88 as shown in FIGS. 19 and 20, with each such strip blank 89 having a width of ¾ inch by way of example. A resulting strip blank 89 is shown in FIG. 21. In FIG. 22, the sides of the polyurethane layer P are shown being formed with the recessed reinforcement edges 35 and 36 by means of a heated platen HP as shown in my U.S. Pat. No. 5,797,813. Alternatively, such recessed reinforcement edges may be formed with heated rollers as shown in my U.S. Pat. No. 6,203,308. In FIG. 23, the sides of the EVA layer E are shown being skived as by rotating knives 90, 91 in a conventional manner so as to define the slanted side edges 38 and 39 of a completed strip S. In FIG. 24, the conventional peel-away tape T is shown applied to the underside of the EVA layer.

Referring now to FIGS. 25–30, there is shown a resilient rubber-like underlisting sleeve U which can be utilized in forming a slip-on grip G made by the method of the present invention. Underlisting sleeve U is fabricated of a synthetic plastic foam or rubber utilizing an integral cap 93. Below the cap 93 there is formed a groove 94 to receive the starting end of a strip S. The lower end of the sleeve is formed with an integral nipple 95. The upper portion of nipple 95 is provided with an upwardly-facing circumferential groove 96 defined by a resilient lip 99. Underlisting sleeve U is similar to that described in my U.S. patent application Ser. No. 09/497,750, now U.S. Pat. No. 6,386,989.

Figure 28:
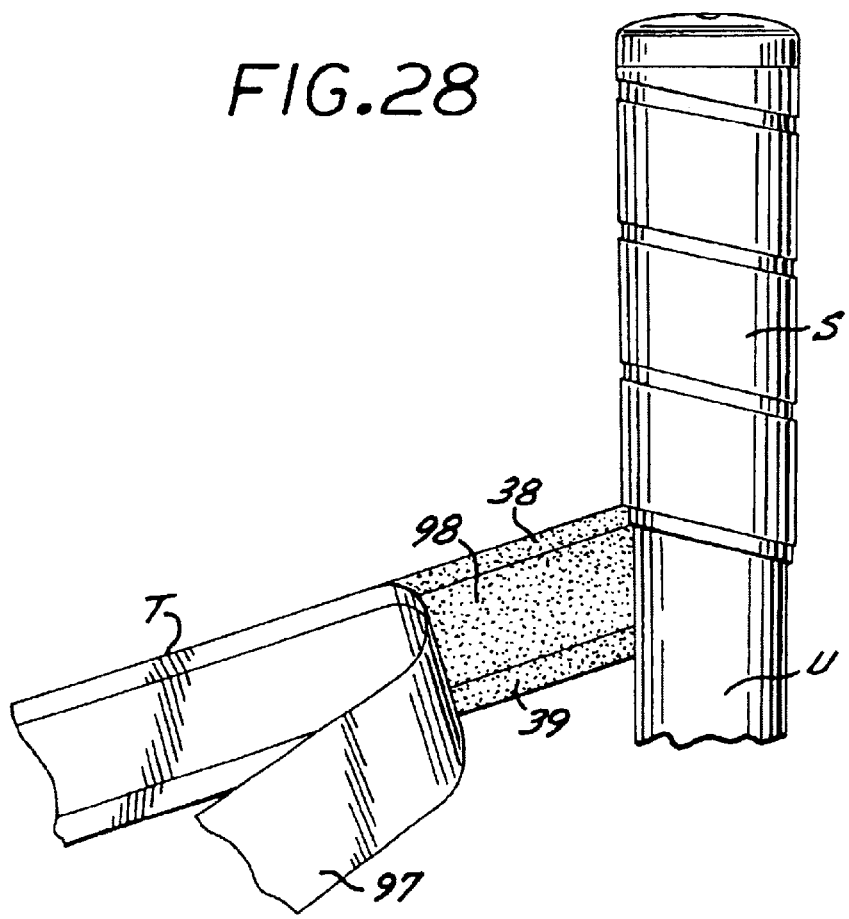
FIG. 28 is a broken perspective view showing a polyurethane/EVA strip made in accordance with the present invention, being spirally wrapped around the upper portion of the underlisting sleeve of FIGS. 25, 26, and 27.
Figure 29:
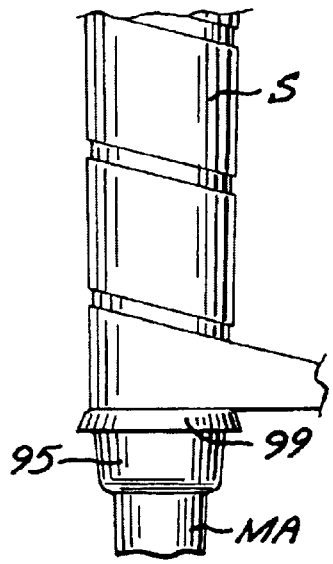
FIG. 29 is a side elevational view showing the polyurethane/EVA strip being wrapped around the lower portion of the underlisting sleeve.
Figure 30:
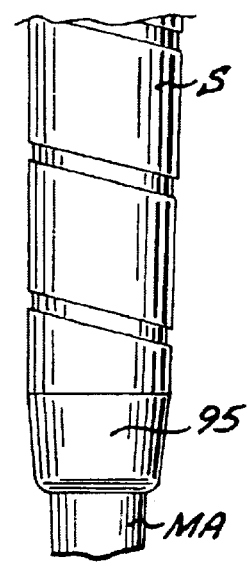
FIG. 30 is a broken side elevational view showing the polyurethane/EVA strip after is has been secured to the aforementioned underlisting sleeve.

Referring to FIGS. 28, 29, and 30, to apply strip S to the underlisting sleeve U, the paper 97 of protective tape T is peeled-off to expose adhesive 98 as indicated in FIG. 28. The strip S is then spirally wound around the underlisting sleeve U, the tip of the strip starting edge being first inserted in the groove 94 of the sleeve whereafter the strip is wrapped about one and a half times around the upper or butt end of the sleeve to provide a smooth configuration of the strip on the sleeve. With continued reference to FIG. 28, and additionally to FIG. 29, as the strip S is wrapped around the underlisting sleeve U the underside of the recessed side edges 38 and 39 of the EVA layer E overlap one another with such edges being secured together in a water-type manner by adhesive 98. When the lower edge of the strip has been spirally wound to a position wherein its lower edge is disposed in approximate horizontal alignment with the lower portion of the nipple groove 96. The lip 99 is folded downwardly, and the lower portion of the strip is manually urged into the confines of the groove 96. When the lip snaps back to its original position, such lip will securely retain the lower end of the strip S within the nipple 95 to prevent unraveling of the strip and provides a nicely finished appearance of the grip. It should be understood that the underlisting sleeve U may be disposed upon a conventional collapsible mandrel MA as the strip is wrapped therearound. After the strip and sleeve combination is removed from the mandrel MA such combination will define the aforedescribed strip G which is slipped over the handle of a golf club as shown in FIG. 1. The strip S may also be sold separately from the underlisting sleeve U so as to provide a replacement for the strip originally supplied with the underlisting sleeve, or for direct application to the butt end of a bare golf club handle (not shown).

From the foregoing description it will be apparent to those skilled in the art that a golf club grip made in accordance with the method of the present invention will provide the tackiness and shock absorbing advantages of a polyurethane/felt grip and the water excluding and light-weight advantages of a polyurethane/EVA grip.

While a particular form of the invention has been illustrated and described, it will also be apparent to those skilled in the art that various modifications can be made without departing from the spirit and scope of the invention. Accordingly, it is not intended that the invention be limited except by the appended claims.

I claim:

1. A method of making a golf club handle grip, said method including the steps of:

providing a temporary support;

applying a coating of uncoagulated polyurethane to one side of the temporary support for said polyurethane;

coagulating the polyurethane by a wet process to form pores in the coagulated polyurethane, said polyurethane having a thickness greater than about 0.1 mm;

separating the coagulated polyurethane from the temporary support;

providing a sheet of EVA;

then adhering the EVA to a surface of the coagulated polyurethane, with the EVA providing strength for the coagulated polyurethane, while the coagulated polyurethane cooperates with the EVA to absorb shocks and the polyurethane also providing tackiness to the exterior surface of grip material, cutting the sheet of EVA and coagulated polyurethane into a plurality of strip blanks;

heat forming recessed reinforcement edges in the polyurethane along the sides of the strip blanks; and skiving the sides of the EVA along the length of the strip blanks.

2. A method as set forth in claim 1, wherein the temporary support is a fluid-permeable textile.

3. A method as set forth in claim 1, wherein the temporary support is a nylon cloth.

4. A method as set forth in claim 1, wherein the temporary support is a polyester cloth.

5. A method as set forth in claim 1, wherein the thickness of the EVA is about 0.3 mm–2.20 mm.

6. A method as set forth in claim 1, wherein the temporary support is collected for re-use with another coating of polyurethane to make additional grip material after the coagulated polyurethane has been stripped therefrom.

* * * * *